United States Patent [19]

Narang

[11] 3,994,615

[45] Nov. 30, 1976

[54] MULTIPLE PART CUTTING TOOL

[76] Inventor: Rajendra K. Narang, 1525 Bonnie Road, Macedonia, Ohio 44056

[22] Filed: June 12, 1975

[21] Appl. No.: 586,191

[52] U.S. Cl. .............................. 408/226; 279/83; 408/233
[51] Int. Cl.² ........................................ B23B 51/02
[58] Field of Search ............ 408/226, 233, 713, 81; 279/83, 100, 103

[56] References Cited

UNITED STATES PATENTS

| | | | |
|---|---|---|---|
| 748,890 | 1/1904 | Taylor et al. | 279/103 X |
| 1,285,869 | 11/1918 | Wineman | 408/233 |
| 1,837,648 | 12/1931 | Bell | 279/100 |
| 2,150,189 | 3/1939 | Ronneberg | 279/83 X |
| 2,816,769 | 12/1957 | Noble | 279/83 |

FOREIGN PATENTS OR APPLICATIONS

| | | | |
|---|---|---|---|
| 1,098,149 | 7/1955 | France | 408/226 |
| 392,663 | 3/1924 | Germany | 408/226 |
| 384,720 | 11/1921 | Germany | 408/226 |

*Primary Examiner*—Othell M. Simpson
*Assistant Examiner*—W. R. Briggs
*Attorney, Agent, or Firm*—John Harrow Leonard

[57] ABSTRACT

A cutting tool having one portion including a cutting head and another portion including a stem, the portions being separately produced from the same or different metals, or nonmetals, ceramics and the like, and then connected together in coaxial relation by a slip, press, or shrink fit of a polygonal shank of uniform cross section throughout its length on either one of said portions into a complementary polygonal socket in the other portion. Novel means are provided for adjustment of the portions generally radially of the cutting axis to offset differences in concentricity due to manufacturing errors and to assure firm and precise coaxial relation of the assembled portions.

8 Claims, 15 Drawing Figures

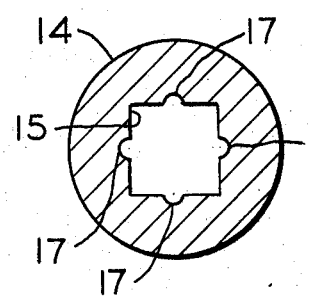
FIG. 7
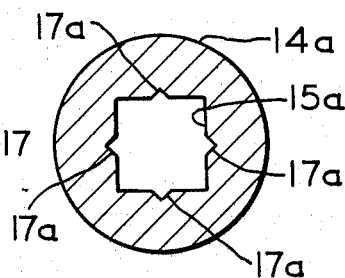
FIG. 8
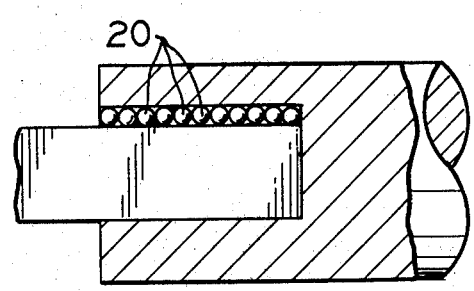
FIG. 9
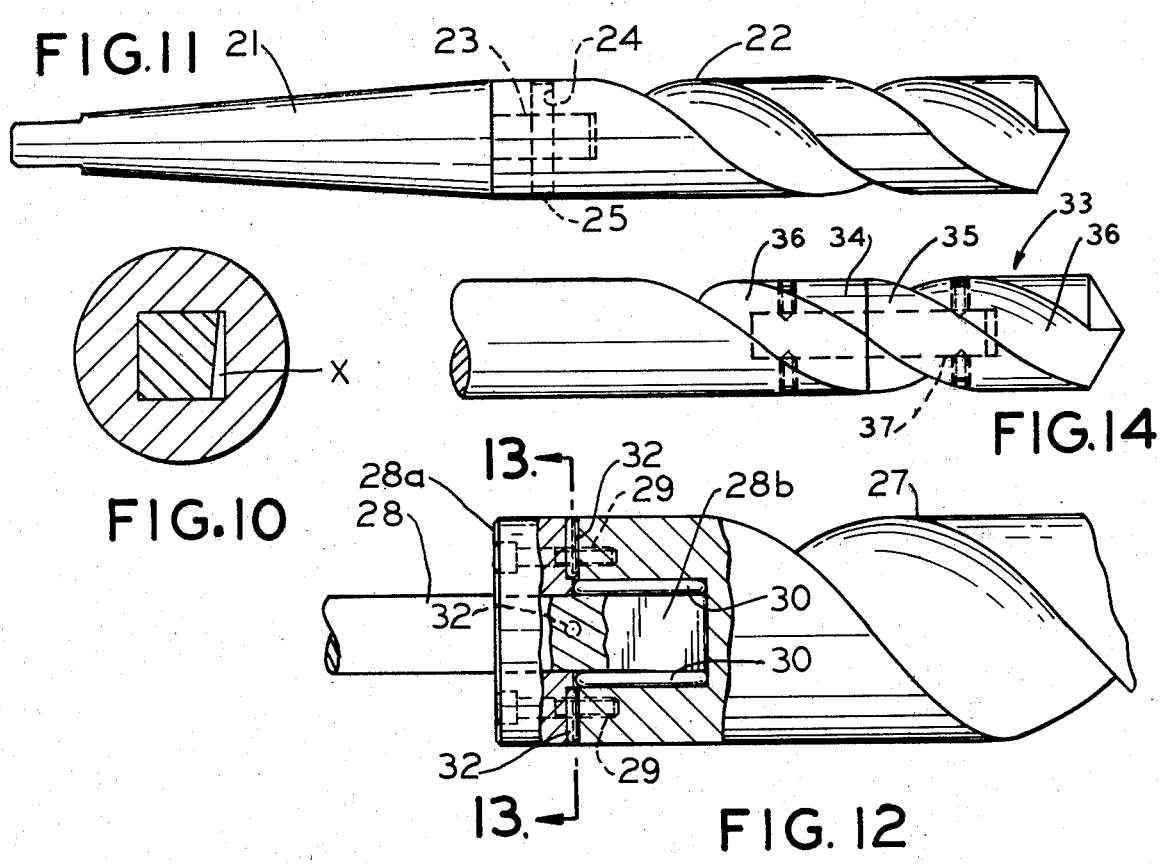
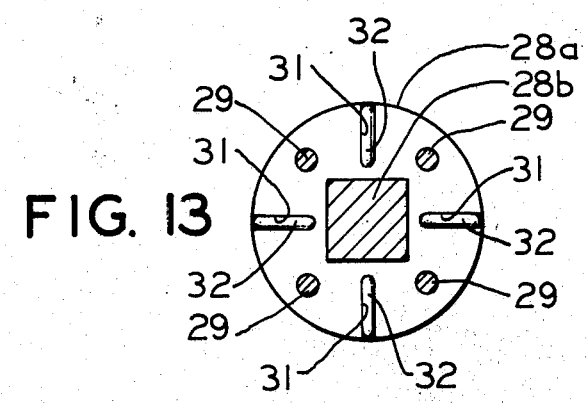

MULTIPLE PART CUTTING TOOL

BACKGROUND OF THE INVENTION

1. Field of Invention

Rotary cutting tools.

2. Description of the Prior Art

Generally, in the manufacture of cutting tools, such as drills, reamers, thread milling cutters, hobbing tools, and the like, the tool stem and cutting head are made integral with each other, the stem being of the same high speed steel or alloy s the head. This one-piece structure is finish ground to the shape and configuration desired. Any manufacturing defect in either the stem or head renders the tool useless for its intended purpose. Sometimes it can be reprocessed to eliminate the defect, but only at a substantial cost.

One attempt to overcome this disadvantage is to form the stem and cutting head separately and of different metal, and then to join them together. Generally, in this practice, the stem is made of a cheaper steel, such as ordinary carbon steel, and the head of high speed cutting steel or alloy. To this end the cutting head is formed with an axial cylindrical shank which is received in a complementary socket in the separately made stems, though in some instances the socket is formed in the cutting head and the shank is provided on the stem.

However, in quantity production of such tools, difficulties arise in forming the stem and the head separately with such high precision consistently that they will have true concentricity and coaxial relation when assembled. To overcome this difficulty, the head and stem are often assembled prior to any grinding of the tool head or the tool stem. The configuration of some of these shanks and sockets are such that the metal of the head or stem is placed under undue stress during and after assembly. As a result, upon heating and cooling of the tool in use, and subjection of the tool to torsional stresses, fractures and deviations from concentricity often occur in the multi-piece structure. Further, if the cutting head or stem is damaged the damaged part cannot be removed and a like new part substituted therefor.

In accordance with the present invention, the tool is formed in two separate parts; for example, the stem and head of the tool are formed separately, and of different metal, with interfitting polygonal connecting parts, and then are assembled and precision finish ground to final proportions and configuration with assurance of concentricity of true coaxial relation of the head and stem. If either the stem or head is damaged or worn out, the two can be disassembled without damaged to, or marring of, the undamaged or unworn one of the two and the worn or damaged one replaced with a new one at the work site, at a considerable saving in time and cost, thereby resulting in an increase in productivity of the machine in which the cutting tool is used.

The separate parts can be heat treated independently of each other, so that both can be given the heat treatment most nearly optimum for imparting the necessary characteristics for their particular functions in the combination. The separate treatment can be carried on in different furnaces concurrently, dependent upon the type of metal, with assurance of a ore uniform product. Since each part of the tool is smaller than the whole and is of different metal, the heat treating cycle for each part can be simplified. Further, the machining cost of keeping each part straight and the cost of the necessary fixture for holding each part while machining are reduced.

Again, the life of the grinding wheels and the like used for grinding during original production is greatly increased. Scrap and reworking are less costly. If only one part of the tool is worn out or damaged, the other part can be salvaged readily, whereas salvaging of an entire one-piece tool normally necessitates the step of hard chrome plating and regrinding of the entire tool, and such plate and regrinding are expensive, both as to time and labor, and also as to the chrome metal required. With the present tool, only one part needs to be plated if a like salvage operation is to be used.

In accordance with the present invention, specific means are provided for adjusting the concentricity of the separate stem and head of the tool, so as to overcome deviations, if any, from precision in original manufacturing steps prior to grinding, and in replacement of one or the other parts of the tool,

BRIEF DESCRIPTION OF THE DRAWINGS

The present invention is shown in the accompanying drawings as applied to a simple drill, its use in other rotary tools being readily apparent from the illustrative example.

FIG. 7 is a cross sectional view of the part of the drill which includes the cutting head of FIGS. 5 and 6, with the shank removed, and illustrating the grooves used in centering the parts which include the head and stem, respectively;

FIG. 8 is a view similar to FIG. 7 and showing a modified form of the grooves;

FIG. 9 is a fragmentary longitudinal sectional view, similar to FIG. 5, illustrating another modified form of centering pin;

FIG. 10 is a diagram illustrating a difficuty in centering a head and stem of a tool by the conventional shimming method;

FIG. 11 is a modified form of the invention, showing a further connecting means between the part of the drill including the cutting head and the part including the stem; FIG. 12 is a fragmentary longitudinal view, partly in section, illustrating the application of the invention to large diameter drills;

FIG. 13 is a cross sectional view taken on line 13—13 of FIG. 12; and

FIG. 14 is a view similar to FIG. 1 showing a different specific structure embodying the invention and in which the fluting is carried beyond the juncture of the head onto the adjacent part of the stem.

Referring to FIGS. 1 through 3 of the drawings, the drill, indicated generally at 1, includes a stem 2 which is cylindrical or tapered, as is conventional. The stem has an axial socket 3 opening through one end. The socket 3 is of polygonal cross section, preferably square, pentagonal, or hexagonal, and is of substantially uniform cross section throughout its length. The stem 2 preferably is made of plain, medium or high carbon steel, depending upon the uses to which the drill is to be put.

Figure 1:
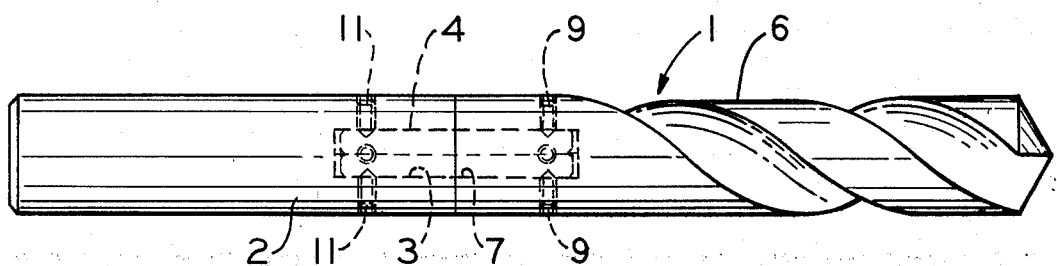
FIG. 1 is a side elevation of a drill embodying the principles of the present invention.

For connecting the stem 2 to a tool head, a short rod 4 of cold drawn, plain, medium or high carbon steel, with a cross section of uniform size and shape throughout its length, and of the same shape as that of the socket 3, but very slightly larger in its cross dimensions, is press fitted or shrink fitted permanently in the socket 3 and extends beyond one end of the stem 2. Near its outer end, the rod 4 has notches 5 at its corners, for purposes later to be described. Generally, these notches are V-shaped. The stock for the rod 4 can be purchased in the cross section desired and readily cut to length and ground or machined for slip, press, or shrink fitting into the socket 3. The complementary wall surfaces of the rod and those of the socket are smooth and planar, and free from knurling and the like.

The flutted cutting portion or head 6 of the drill 1 is made of high speed or tool steel or other alloy, depending upon the use for which it is designed. The heat 6 is provided at the end opposite its cutting tip with a socket 7 which, throughout its effective length, preferably is of substantially the same cross sectional shape as the rod 4, but the same or very slightly smaller in cross sectional dimensions. The walls of the socket 7 are smooth and planar. The rod 4 fits the socket very precisely with a slide, press, or shrink fit. As a result, the head 6 can be removed from the rod 4 and a new or duplicate head 6 substituted. In the case of a slide fit, this can be done with the tool head and stem in their original condition. If press or shrink fitted, they are subjected to localized heating of the joined portions of the head and rod for a very short time, keeping heat at low intensity and then withdrawing the heat from the rod.

The head 6 is provided with at least two, and preferably three or four, threaded radial bores 8 which are angularly disposed relative to each other about the socket axis to such a degree screws 9 can be manipulated therein to engage and move the head 6 and rod 4 into concentric relation and secure them in that position in case of slight manufacturing errors. For example, with a square rod 4, two screws 8 arranged 90° from each other at two adjacent corners of the socket 7 can be used. The screws 9 are tapered at their inner ends so as to enter the notches 5. With this arrangement, two components of movement for centering are provided. If the rod and head cannot be centered in one relatively rotated position about the tool axis, they can be separated and rotated 90° or 180° relative to each other, reconnected and centered by the screws 9.

On the other hand, if three or four screws are provided, centering can be effected without separating and rotating the parts. The screws 9 are particularly desirable when a slip fit between the rod 4 and head 6 is provided, as they lend themselves readily to centering of the rod 4 and head 6, and also to prevent axial separation during retraction of the tool from the work.

Figure 4:
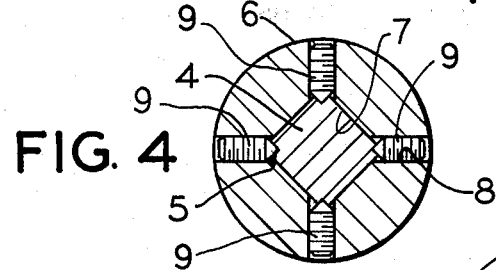
FIG. 4 is a cross sectional view of th drill, similar to FIG. 3, and is taken on the line 4—4 in FIG. 3.
Figure 4A:
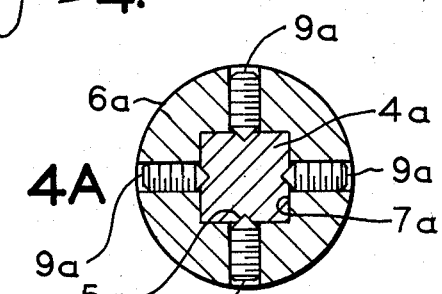
FIG. 4A is a cross sectional view, similar to FIG. 3, illustrating a modified form of the concentricity adjusting means for the drill parts.

Instead of the screws 9 engaging the corners of the rod 4, screws 9a may be used and mounted in bores 8a positioned so that the screws 9a engage the faces of the rod 4a, as indicated in FIG. 4A.

Since the rod 4 has a slip, press, or shrink fit engagement with the head 6, the head 6 can readily be removed from the rod 4 for replacement without applying any gripping jaws to the stem 2 and without marring either the head or stem, by applying a rapid low heat to the surface of the head 6 at the location of the socket, so as to enlarge the socket to a substantial degree to facilitate withdrawal of the rod 4 from the head.

As an alternative, the rod 4 can be formed as an integral part of the stem 2. This alternative is expensive due to the higher quality steel that might be required for the stem 2 as compared to the rod 4, and the machining procedures required to form the rod 4 as an integral part of the stem.

As an additional alternative, instead of adjustment between the rod 4 and head 6, radial threaded bores 10 may be provided in the stem 2 and screws 11 mounted therein for adjusting the rod 4 radially in the stem, in the same manner as the head 6 and rod 4.

In some instances, the rod 4 may not be quite square, but slightly trapezoidal in cross section, one side sloping slightly inwardly transversely of the cross section of the rod and socket, leaving a space $x$, as illustrated diagrammatically in FIG. 10. The ordinary flat metal shims could not be used practically for centering under such conditions, because the space $x$ between the rod 4 and the adjacnet wall of the socket 7 might be large enough to receive the shim at one edge of the face, but not at the other edge. With a space $x$ of tapering cross section, a shim of constant thickness could not be inserted, and it would be impractical to provide shims with all different degrees of tapered cross sections for meeting the manifold conditions that might arise. The present arrangement can overcome this defect in manufacture as no shims of this character are required.

Figure 5:
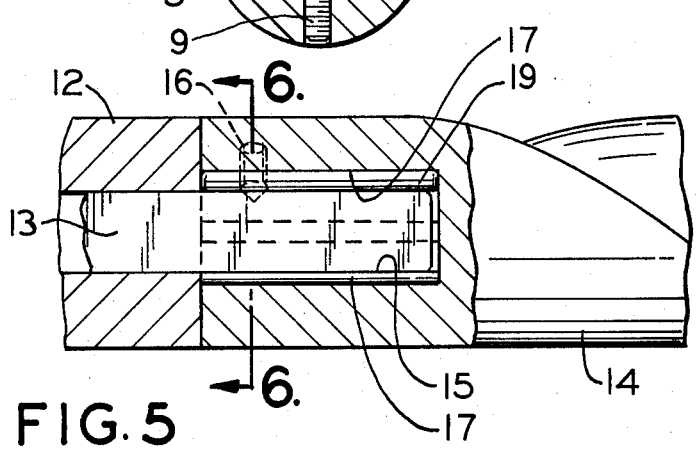
FIG. 5 is an enlarged fragmentary longitudinal sectional view of a drill, such as illustrated in FIG. 1, and illustrating the use of modified means for centering the drill parts, and is taken on line 5—5 of FIG. 6.
Figure 6:
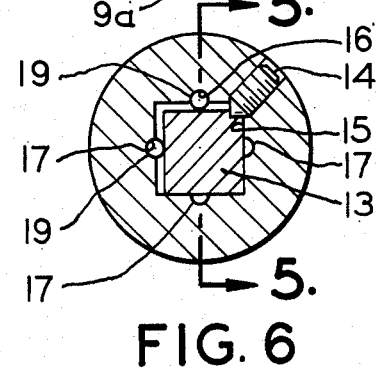
FIG. 6 is a cross sectional view of the drill illustrated in FIG. 5 and is taken on line 6—6 thereof.

Instead, in the modified form of the invention illustrated in FIGS. 5 through 7, the drill has a stem 12, such as hereinbefore described, with an axially projecting rod 14 having an axial socket 15. One or more screws 16 may be mounted in the head 14 and cooperate with the rod 12 to retract the head when the tool is retracted from a bore in a workpiece.

Each groove 17 may be a half-cylinder which is intersected at its diameter by the associated socket wall so that the circumferential walls of different sizes of pins 19 may be inserted therein, up to the full radius of the socket, endwise through the open ends of the grooves 17 with a slip fit and can protrude radially beyond the socket wall into the socket the required distance, depending on the diameter of the pin, and thus bear against the adjacent face of the rod 13.

If desired, instead of the grooves 17 being half-cylindrical, they may be less than half-cylindrical, with their centers spaced inwardly of the socket 15 from the socket walls.

Again, as illustrated in FIG. 8, the centering grooves 17a may be in the form of a mere V-shaped cross section, disposed with their side walls flaring away from each other in a direction toward the axis of the bore 15a.

The grooves described permit a wide range of adjustment, as the pins used can be selected in diameter so that the circumferential wall of each may extend into the bore 15 or 15a from less than a thousandth of an inch to several thousandths of an inch.

It is to be noted that each of the grooves 17 is midway between the edges of the associated face of the rod 13.

The head 14 and rod 13 are thus brought into coaxial relation, after measurement of the eccentricity and selection of a proper pin, or by trial and error with selected ones of the pins 19. The screw or screws 16 are then tightened to secure the rod 13 and head 14 from separation axially.

Instead of cylindrical pins 19, such as hardened and polished rollers of the type used in roller bearings, balls 20 of the type used in ball bearings may be used for pins. In such case, each groove contains a row of balls of equal diameters, as illustrated in FIG. 9. Since the pins 19 or balls 20 are of uniform diameter, the effect in either case is a linear contact with the transverse center of each face of the rod at the transverse center of each face of the socket. Therefore it does not matter whether the rod is truly square or trapezoidal, or precisely of the polygonal shape desired, as an out-of-round rod, regardless of cross sectional shape can be brought to concentricity by the centering means disclosed.

In FIG. 11, another modification is illustrated in which a stem 21 and head 22, each provided with an axial polygonal socket, are joined by a rod 23 in the manner heretofore described in connection with FIGS. 1 and 2, except that, instead of radial screws as therein described, a single transverse bore 24 extends entirely through the head 22 and rod 23 and a pin 25 is inserted therein.

In FIG. 12, a large size drill is illustrated in which a large diameter head 27 is made separate from a smaller diameter stem 28 having an integral shank 28a. An enlarged collar 28b is slipfitted on the stem. The collar 28b is connected to the head by bolts 29. Such a stem may be entered as heretofore described in FIGS. 1 and 2 or by pins 30, as in FIGS. 5 and 6, and, if the axes of the head and stem are oblique to each other, such obliquity can be eliminated by providing radial grooves 31 in the color 28b, and adjusting pins 32 therein which function to rock the stem into coaxial relation with the head in the manner that the pins 19 function for their centering adjustment.

Figure 2:
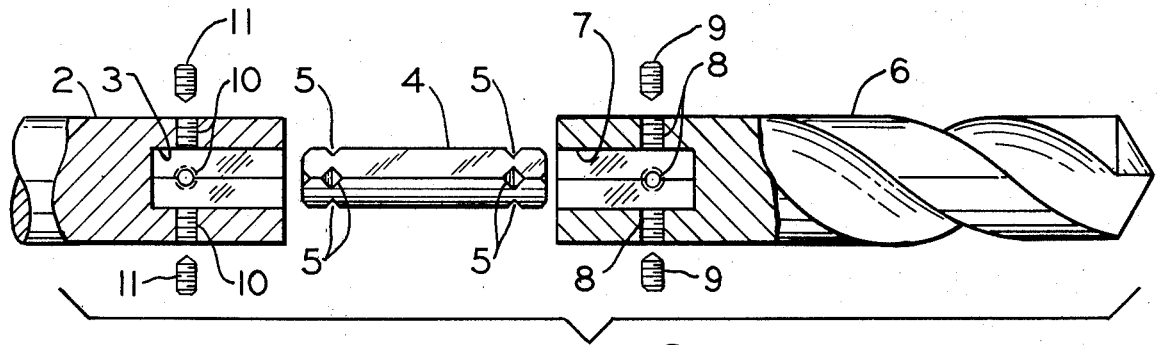
FIG. 2 is an exploded side elevation of the drill illustrated in FIG. 1, showing the parts in position for assembling.
Figure 3:
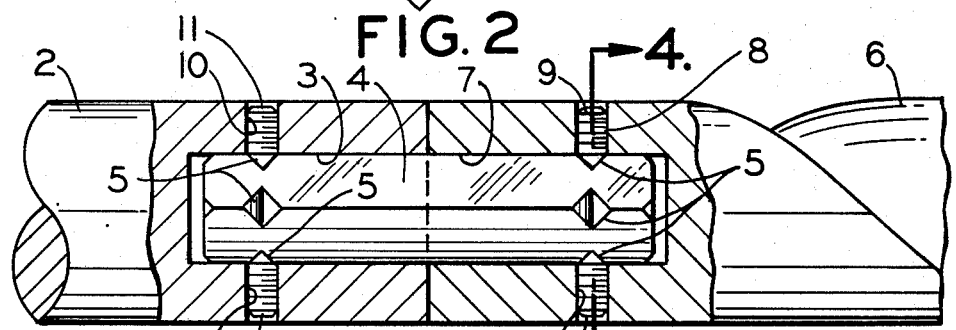
FIG. 3 is an enlarged fragmentary view of the drill illustrated in FIG. 1, showing one means for adjusting the parts for concentricity.

In FIGS. 1 and 2, the drill is shown as having an unfluted stem, the juncture between the head and stem being positioned beyond the ends of the fluting on the head in a direction away from the cutting tip. In many instances, it is desirable that the fluting, especially on very long drills, extend beyond this juncture and into the stem. Such a modification is illustrated in FIG. 14 wherein a drill 33 similar to that in FIG. 1 is illustrated, but differing in that it has a stem 34 and a head 35 in which the flutes 36 continue from the tip of th head, across the juncture of the head, and onto the stem. The two parts, the head and stem, are connected by a rod 37 in the same manner as the like parts in FIG. 1 are connected by the rod 4.

Having thus described my invention, I claim:

1. A cutting tool comprising:
   a metal cutting head member of predetermined composition;
   a metal stem member of predetermined composition;
   an axial smooth wall shank of polygonal cross section of uniform size and shape on one end of one of said members;
   the other one of said members having an axial, smooth wall socket of like uniform polygonal cross section and opening through one end of said other one of said members;
   said shank being received with radial clearance in said socket through said open end and being mounted fixedly therein and holding the members in approximate coaxial relation to each other;
   adjustable securing means carried by said other one of the members and have portions extending into the socket thereof and engaging the shank for shifting the position of the shank in directions transversely of the socket to place the members in coaxial relation;
   said adjustable securing means comprise at least two screws mounted in said other member with their axes substantially coplanar and for movement endwise inwardly into and outwardly away from the axis of the socket; and
   said screws being angularly disposed relative to each other about the axis of the socket.

2. A cutting tool according to claim 1 wherein said screws are positioned to engage the shank at circumferentially spaced apexes thereof, respectively.

3. A cutting tool according to claim 1 wherein the screws engage faces of the shank, respectively, at the transverse midportions thereof.

4. A cutting tool according to claim 1 wherein said one of said members also has a smooth wall socket of like uniform polygonal cross section and opening through one end;
   said shank is a separate element received in both of said sockets, with those ends of the members through which the sockets open being in face to face contact with each other; and
   said adjustable securing means further include at least two screws mounted in said one member with their axes substantially coplanar and for movement endwise inwardly into, and outwardly out of, the socket of said one member.

5. A cutting tool comprising:
   a metal cutting head member of predermined composition;
   a metal stem member of predetermined composition;
   an axial smooth wall shank of polygonal cross section of uniform size and shape on one end of one of said members;
   the other one of said members having an axial, smooth wall socket of like uniform polygonal cross section and opening through one end of said other one of said members;
   said shank being received in said socket through said open end and being mounted fixedly therein and holding the members in coaxial relation to each other;
   characterized in that
   the stem member is smaller is diameter than the head member throughout its length;
   a collar member of larger diameter than the stem member is slidably fitted on the stem member at the end portion thereof adjacent the head member;
   the end of at least one of the collar and head members has a plurality of radial grooves therein;
   said grooves are elongated endwise, extend endwise generally radially of he head and collar members, and are open laterally toward the end of the other of the last mentioned members;

adjusting pins are disposed in the grooves, respectively, the circumferential wall of each pin having a portion extending beyond the end surface on the one of said last mentioned members toward, and engaging, the adjacent end surface of the other of said last mentioned members;

said pins being selected as to diameter, so as to adjust the stem member and head member into assembled coaxial relation; and means to secure the head member and stem member in the relative position into which they have been adjusted by said pins.

6. A cutting tool comprising:

a metal cutting head member of predetermined composition;

a metal stem member of predetermined composition;

an axial smooth wall shank of polygonal cross section of uniform size and shape on one end of one of said members;

the other one of said members having an axial, smooth wall socket of like uniform polygonal cross section and opening through one end of said other one of said members;

said shank being received in said socket through said open end and being mounted fixedly therein and holding the members in coaxial relation to each other;

characterized in that said other one of the members has a plurality of grooves therein opening laterally into the socket through walls of the socket, respectively;

said grooves are elongated and, endwise, extend generally longitudinally of the socket;

adjusting pins are disposed in the grooves, respectively; and said pins are selected, as to diameter, so that the said circumferential wall of each pin extends into the socket the proper distance to firmly engage the shank when the shank is in coaxial relation with the axis of the cutting head member.

7. A cutting tool according to claim 6, wherein said pins are elongated, hardened, and ground cylindrical rollers.

8. A cutting tool according to claim 6, wherein each pin comprises a row of hardened and ground balls.

* * * * *

UNITED STATES PATENT OFFICE
CERTIFICATE OF CORRECTION

PATENT NO. : 3,994,615
DATED : November 30, 1976
INVENTOR(S) : Rajendra K. Narang It is certified that error appears in the above-identified patent and that said Letters Patent are hereby corrected as shown below:

```
Col. 1, line 12, for "s" read --as--;
        line 65, for "ore" read --more--;
Col. 2, line 34, for "th" read --the--;
Col. 3, line 30, for "heat" read --head--;
        line 44, for "heat" read --head--;
Col. 5, line 56, for "th" read --the--;
Col. 6, line 66, "he" should read --the--.
```

Signed and Sealed this

Twenty-second Day of February 1977

[SEAL]

Attest:

RUTH C. MASON
Attesting Officer

C. MARSHALL DANN
Commissioner of Patents and Trademarks